United States Patent [19]

Sherman et al.

[11] Patent Number: 5,299,759
[45] Date of Patent: Apr. 5, 1994

[54] HELICOPTER TURN COORDINATION AND HEADING HOLD MODE CONTROL

[75] Inventors: Porter D. Sherman, Fairfield, Conn.; David H. Hetzler, Media, Pa.; Paul Weisser, Jr., South Windsor; Stuart C. Wright, Woodbridge, both of Conn.

[73] Assignee: United Technologies Corporation, Hartford, Conn.

[21] Appl. No.: 891,624

[22] Filed: Jun. 1, 1992

[51] Int. Cl.⁵ ............... B64C 11/34; G05D 1/04
[52] U.S. Cl. .................... 244/17.13; 244/195; 364/433; 364/434
[58] Field of Search ............ 244/17.13, 194, 195, 244/180, 181; 364/432, 433, 434

[56] References Cited

U.S. PATENT DOCUMENTS

| | | | |
|---|---|---|---|
| 4,003,532 | 1/1977 | Adams et al. | 244/17.13 |
| 4,029,271 | 6/1977 | Murphy et al. | 244/17.13 |
| 4,067,517 | 1/1978 | Barnum | 244/17.13 |
| 4,206,891 | 6/1980 | Perez et al. | 244/17.13 |
| 4,300,200 | 11/1981 | Doe | 244/17.13 |
| 4,484,283 | 11/1984 | Verzella et al. | 244/17.13 |
| 4,645,141 | 2/1987 | McElreath | 244/17.13 |
| 5,099,429 | 3/1992 | Onari et al. | 364/431.05 |
| 5,129,475 | 7/1992 | Kawano et al. | 180/179 |
| 5,195,039 | 3/1993 | Gold et al. | 244/17.13 |

*Primary Examiner*—F. J. Bartuska
*Assistant Examiner*—Virna Lissi Ansley
*Attorney, Agent, or Firm*—Michael Grillo

[57] ABSTRACT

A mode control (25) controls a helicopter flight control system (21) between a heading hold mode and a turn coordination mode according to switching patterns resembling the natural response of an expert pilot to flight conditions. Helicopter operating parameters (31,30) are detected (31,29), and each parameter's detected value is converted from a crisp value to a fuzzy input (100). A new mode fuzzy output is provided by applying a compositional rule of inference (105) across each fuzzy input and a composite mode selection rule base (110). The new mode fuzzy output is converted into a crisp value (112) which is used to determine whether the flight control system operates in the heading hold mode or the turn coordination mode.

13 Claims, 7 Drawing Sheets

FIG. 5A

| SEGMENTS $u_i$ | COMMANDED RATE MEMBERSHIP WEIGHT $\mu_i$ | | | | |
|---|---|---|---|---|---|
| | NEGLIGIBLE | SMALL | MEDIUM | LARGE | VERY LARGE |
| 0 | 1 | 1 | 0 | 0 | 0 |
| 1 | 0 | 0 | 1 | 0 | 0 |
| 2 | 0 | 0 | 0 | .3 | 0 |
| 3 | 0 | 0 | 0 | 1 | 0 |
| 4 | 0 | 0 | 0 | 1 | 0 |
| 5 | 0 | 0 | 0 | 1 | 1 |

FIG. 5B

| SEGMENTS $u_i$ | DURATION MEMBERSHIP WEIGHT $\mu_i$ | | | |
|---|---|---|---|---|
| | MOMENTARY | SHORT | MODERATE | LONG |
| 0 | 1 | 1 | 0 | 0 |
| 1 | 0 | 0 | 1 | 0 |
| 2 | 0 | 0 | 0 | .3 |
| 3 | 0 | 0 | 0 | 1 |
| 4 | 0 | .0 | 0 | 1 |
| 5 | 0 | 0 | 0 | 1 |

FIG. 5C

| SEGMENTS $u_i$ | ROLL ATTITUDE MEMBERSHIP WEIGHT $\mu_i$ | |
|---|---|---|
| | CLOSE TO TRIM | OUT OF TRIM |
| 0 | 1 | 0 |
| 1 | 1 | 0 |
| 2 | 1 | .3 |
| 3 | .3 | 1 |
| 4 | 0 | 1 |
| 5 | 0 | 1 |

FIG. 5D

| SEGMENTS $u_i$ | AIR SPEED MEMBERSHIP WEIGHT $\mu_i$ | |
|---|---|---|
| | SLOW | NOT SLOW |
| 0 | 1 | 0 |
| 1 | 1 | 0 |
| 2 | .3 | .6 |
| 3 | 0 | 1 |
| 4 | 0 | 1 |
| 5 | 0 | 1 |

FIG. 5E

| SEGMENTS $u_i$ | CURRENT/NEW MODE MEMBERSHIP WEIGHT $\mu_i$ | |
|---|---|---|
| | HEADING HOLD | TURN COORDINATION |
| 0 | 1 | 0 |
| 1 | 1 | 0 |
| 2 | 1 | .3 |
| 3 | .3 | 1 |
| 4 | 0 | 1 |
| 5 | 0 | 1 |

HELICOPTER TURN COORDINATION AND HEADING HOLD MODE CONTROL

DESCRIPTION

1. Technical Field

The present invention relates to a mode control for controlling a helicopter flight control system between a turn coordination mode and a heading hold mode, and more particularly to improvements in a mode control for switching between helicopter flight control system modes according to switching patterns resembling the natural response of an expert pilot to flight conditions.

2. Background of the Invention

Helicopters are typically maneuvered by the manipulation of various flight controls, e.g., a cyclic stick, a collective stick, yaw pedals, a force feel actuator, etc., that affect a main rotor blade cyclic pitch and collective pitch and a tail rotor blade collective pitch. The pitch of the main and tail rotors is also affected by an automatic flight control system (AFCS). Among other functions, the AFCS provides a heading hold mode which operates to maintain heading and attitude of a helicopter. Typically, a desired heading and/or attitude is achieved by manual control and then an autopilot is engaged. A signal from an input sensor, e.g., gyro, is used to provide a reference signal, indicative of the attitude or heading signal at the moment that the autopilot is turned on. Heading and attitude are then maintained based on error signals indicative of the difference between the reference signal and the current gyro output.

The AFCS also provides a turn coordination mode which operates in conjunction with the heading hold mode. A normal helicopter turn is made by rolling the aircraft in the direction of the desired turn by providing a roll input via the cyclic stick (or force feel actuator), and introducing sufficient yaw so as to coordinate the turn. A coordinated turn for a helicopter is defined as a banked turn where the body of the helicopter is tangential to a curvilinear flight path and net acceleration is normal to the floor of the aircraft, e.g., no side-slip vectors. The more recent fly-by-wire control systems, see e.g., U.S. Pat. Nos. 4,003,532, 4,067,517, 4,206,891 and 4,484,283, all assigned to the assignee of the present invention, automatically provide a yaw input to match the amount of roll input provided via the cyclic stick. The AFCS commands a coordinating yaw input based on the sensed rate of a yaw rate gyro. The coordinating yaw signal is then used to modify the main and tail rotor command signals as necessary to drive the helicopter's lateral acceleration to zero.

When the autopilot is engaged, the AFCS typically uses a plurality of parameters, e.g., bank angle, roll rate, air speed and pilot stick commanded roll rate, to trigger either heading hold or turn coordination. The selected parameters are compared with a predetermined criterion for selecting either the heading hold mode or the turn coordination mode. For example, if the autopilot is engaged and the AFCS is operating in the heading hold mode, a coordinated turn is initiated if roll attitude is greater than three degrees and roll stick (cyclic stick) is commanding a non-zero roll rate. Alternatively, the AFCS returns to the heading hold mode from the turn coordination mode if the roll attitude is less than three degrees and roll rate is below four degrees per second.

The current methods of heading hold and turn coordination mode control encounter drawbacks because the predetermined criterion does not always provide the flexibility required under various flight conditions. For example, if the AFCS is operating in the heading hold mode and the pilot is trying to trim bank angle to maintain a ground track in a strong cross wind, the AFCS will switch to the turn coordination mode if bank angle exceeds three degrees. Similarly, if the pilot simply wants to trim roll more than three degrees because of an unusual center of gravity (CG) condition, he will not be able to without activating the turn coordination mode. Additionally, the pilot may want to initiate turn coordination if he is commanding a large roll rate, even if the helicopter has not yet rolled beyond three degrees.

DISCLOSURE OF THE INVENTION

Objects of the invention include provision of an improved mode control for switching between a helicopter flight control system heading hold mode and turn coordination mode according to switching patterns resembling the natural response of an expert pilot to flight conditions.

A further object of the invention is to provide a flight control system which applies fuzzy logic for incorporating in its mode control the judgement and operations of an expert pilot, whereby flight control system mode selection judgements resembling those made at the volition of an expert pilot become possible.

According to the present invention, helicopter operating parameters are detected and each parameter's detected value is converted from a crisp value to a fuzzy input wherein the detected value is fuzzified by assigning a membership weight at discrete points or segments on a normalized scale, a new mode fuzzy output is provided by applying a compositional rule of inference across each fuzzy input and a composite mode selection rule base, the new mode fuzzy output is converted into a crisp output by taking the weighted sum of the membership weight at each point on the normalized scale in excess of a threshold value, and a new mode is determined by comparing the new mode crisp output to a set of new mode membership ranges including a heading hold mode membership range and a turn coordination mode membership range.

In further accord with the present invention, the composite mode selection rule base is generated as the composition or cross-product of a plurality of mode selection rules each of which represents a suitable mode selection decision based on various operating parameter membership ranges.

The present invention provides improved flight control system mode control which more accurately resembles the natural response of a pilot to actual flight conditions. Mode control is provided by mode selection rules which characterize expert pilot experience and control engineering knowledge for making mode selection decisions based on helicopter operating parameters. A composite mode selection rule base reflects the combined encapsulated knowledge of all mode selection rules for each potential combination of operating parameters.

The composite mode selection rule base is provided as a look-up table, and defines a composite mode selection output signal for all possible combinations of the operating parameters. The look-up table can be implemented by off-line processing in order to minimize the use of on-line processing and to shorten running time. Additionally, by providing the composite mode selection rule base, the processing time is made independent of the number of rules.

The foregoing and other objects, features and advantages of the present invention will become more apparent in light of exemplary embodiments thereof, as illustrated in the accompanying drawings.

BRIEF DESCRIPTION OF THE DRAWINGS

FIGS. 5a through 5e are tables showing the membership weight at each point on a normalized scale, respectively for a commanded rate, duration, roll attitude, air speed and current/new mode fuzzy sets.

BEST MODE FOR CARRYING OUT THE INVENTION

The flight control system mode control of the present invention is particularly well suited for switching between a helicopter flight control system heading hold mode and turn coordination mode according to switching patterns resembling the natural response of an expert pilot to flight conditions.

Figure 1:
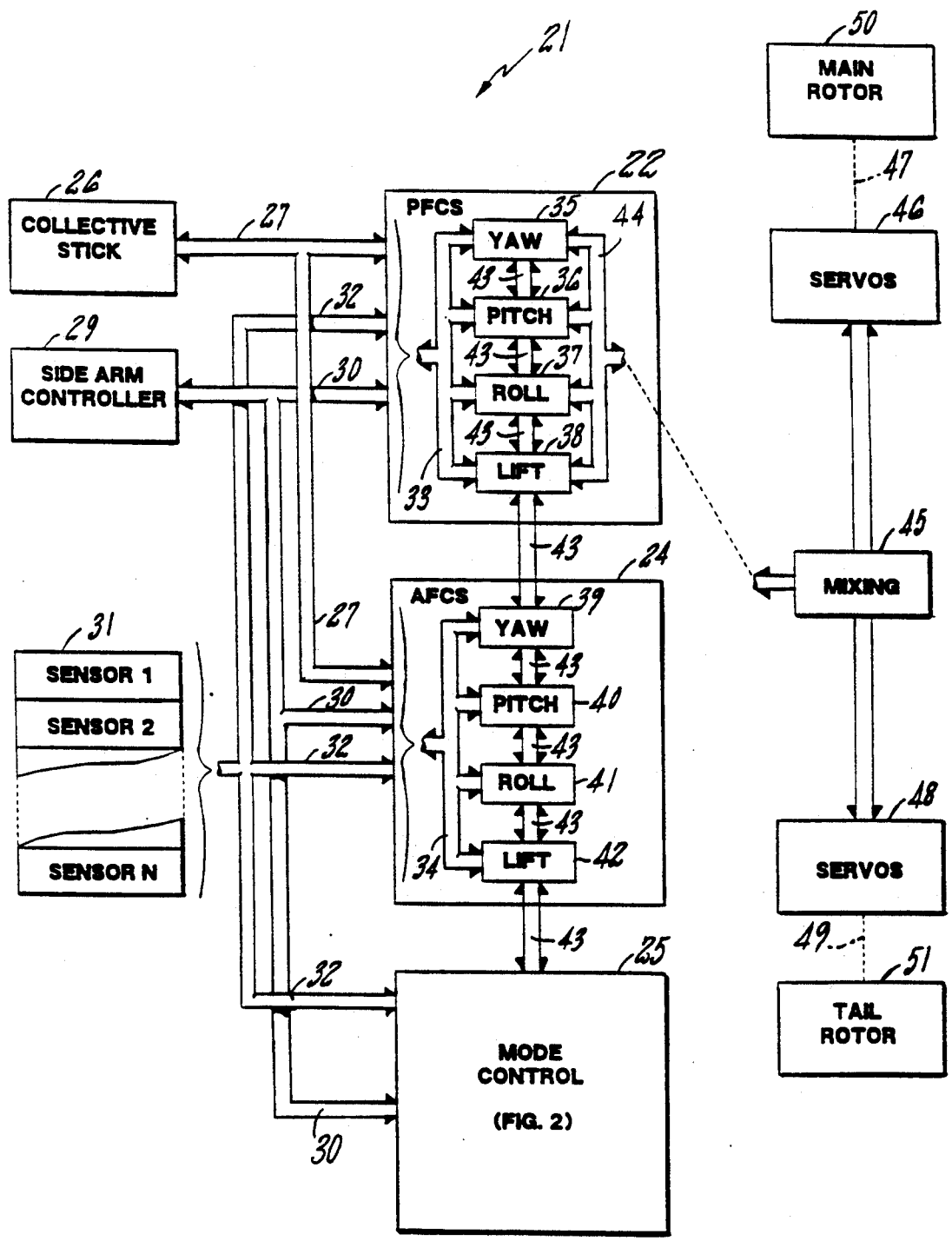
FIG. 1 is a block diagram of a flight control system having mode control in accordance with the present invention.

Referring to FIG. 1, the system of the present invention 21 includes a primary flight control system (PFCS) 22, an automatic flight control system (AFCS) 24 and a mode control 25. The PFCS receives displacement command output signals from a displacement collective stick 26 on lines 27. The AFCS also receives collective stick discrete output signals on the lines 27. The PFCS and AFCS each receive the force output command signals of a four-axis sidearm controller 29 on lines 30. The AFCS and PFCS also receive sensed parameter signals from sensors 31 on lines 32. The pilot command signals on lines 27 and 30 and the sensed parameter signals on lines 32 are shown consolidated within trunk lines 33 and 34 in the PFCS and AFCS, respectively.

The PFCS and AFCS each contain control modules for controlling the yaw, pitch, roll and lift attitude axes of the aircraft. These modules are shown by blocks 35-38 for the PFCS and blocks 39-42 for the AFCS. The PFCS modules provide rotor command signals, and the AFCS modules provide conditioning and/or trimming of the PFCS rotor command signals The PFCS and AFCS modules are interconnected through bus 43.

The PFCS and AFCS use a model following algorithm in each control axis to provide rotor command signals on output lines 44 to a rotor mixing function 45 which commands displacement of mechanical servos 46 and linkages 47 to control the tip path plane of a main rotor 50. Additionally, the rotor mixing function 45 controls tail rotor servos 48 which control the thrust of a tail rotor 51 through linkages 49. The sensed parameter signals from sensors 31, on lines 32, provide the PFCS and AFCS with the aircraft's angular rate and attitude response to the main rotor and tail rotor command signals. Additionally, the sensors provide information related to velocity, altitude, acceleration, etc., which information may or may not be used by the flight control system.

During operation in a heading hold mode, the AFCS provides the desired yaw heading, and pitch and roll attitude reference. The difference between these reference commands and the actual aircraft heading and attitude are heading and attitude feedback error signals which the AFCS continuously attempts to reduce to zero, thereby maintaining the desired helicopter reference attitude. During operation in a turn coordination mode, the AFCS automatically provides a yaw input to match the amount of roll input provided via pilot input commands. The magnitude of the coordinating yaw input is based on the sensed rate of a yaw rate gyro, and the coordinating yaw input modifies the main and tail rotor command signals as necessary to drive the helicopter's lateral acceleration to zero.

Figure 2:
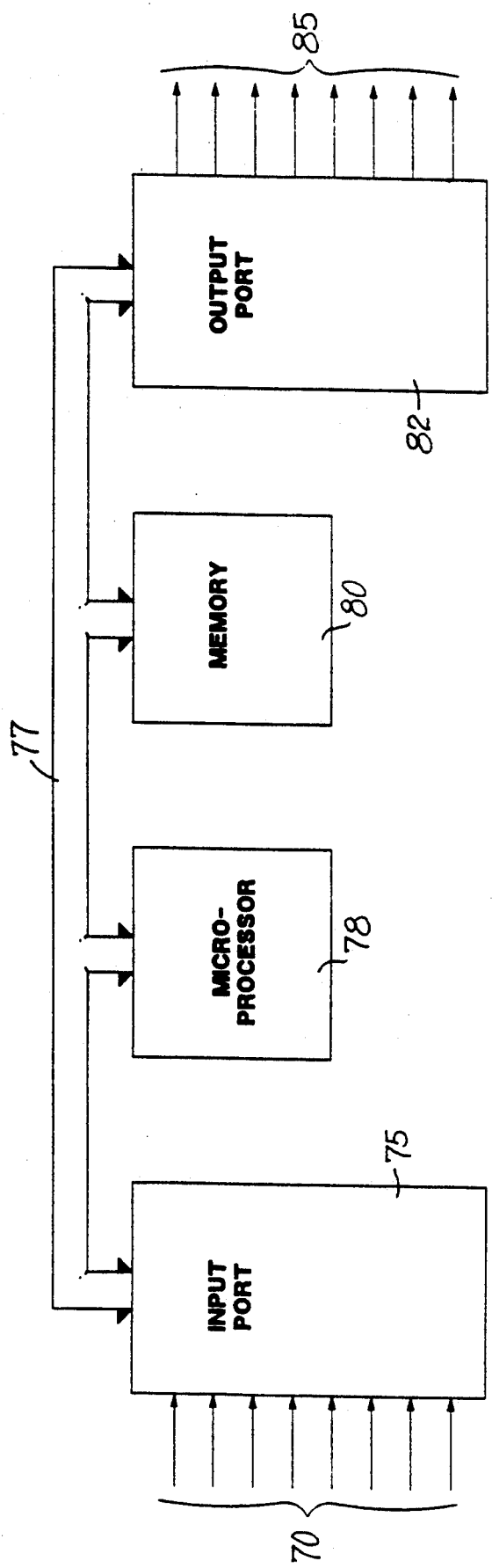
FIG. 2 is a simplified schematic block diagram of a microprocessor system for implementing the flight control system embodiment of FIG. 1.

FIG. 2 shows the architecture of a microprocessor based flight control system 21. Collective stick output signals on lines 27, side arm control command signals on lines 30 and sensed parameter signals on lines 32, shown collectively as lines 70, are provided to an input port 75. Depending on the format of the input signals, e.g., analog or digital, the input port may include an analog-to-digital converter, a frequency-to-digital converter, and such other signal conditioning functions known to those skilled in the art as being required to transform the input signals to digital signal format.

The input port is connected through an address/data bus 77 to a microprocessor 78 (e.g., Intel 80286, Motorola 68020), memory means 80 (e.g., RAM, UVPROM, EEPROM, etc.), and an output port 82. The output port may comprise a digital-to-analog converter, a parallel-to-series converter, a discrete output driver, and such other signal conversion functions known to those skilled in the art as being required to transform the digital format to that required by the system output function. The output port lines 85 include the interconnecting bus 43, and the PFCS output lines.

Everything described thus far is in accordance with the skill of the art, and is intended to be exemplary of the type of control provided by a helicopter flight control system having heading hold and automatic turn coordination.

Referring again to FIG. 1, and in accordance with the present invention, the mode control 25 is interconnected to the AFCS and PFCS through bus 43, and utilizes fuzzy logic for switching the helicopter flight control system between the heading hold mode and the turn coordination mode. The mode control 25 receives commanded roll rate signals and signals indicative of the duration of the roll rate command from the side arm controller 29 on lines 30. Additionally, the mode control receives roll attitude and air speed signals from sensors 31 on lines 32.

Figure 3:
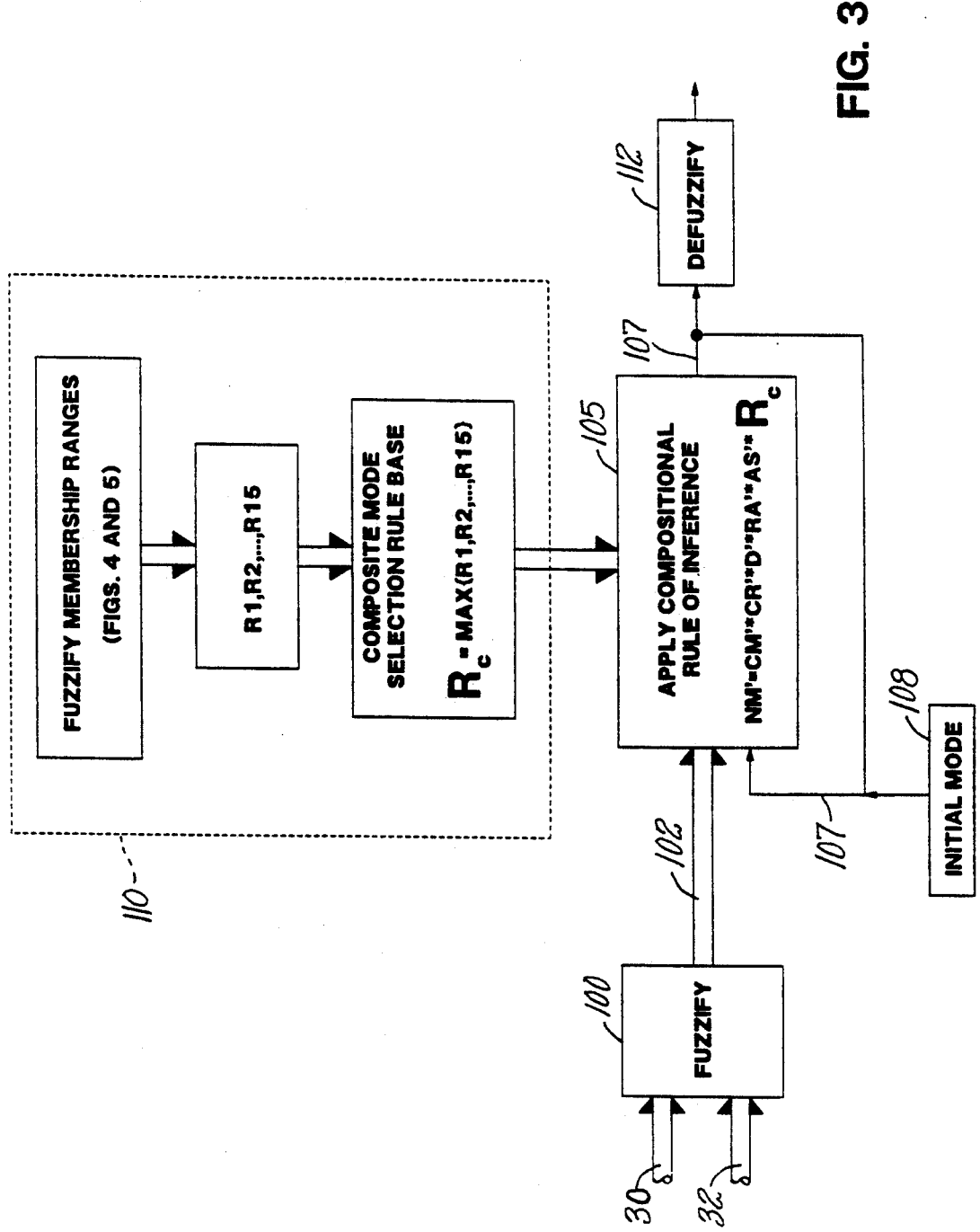
FIG. 3 is a simplified schematic block diagram of a mode control portion of the flight control system of FIG. 1.
Figure 4A:
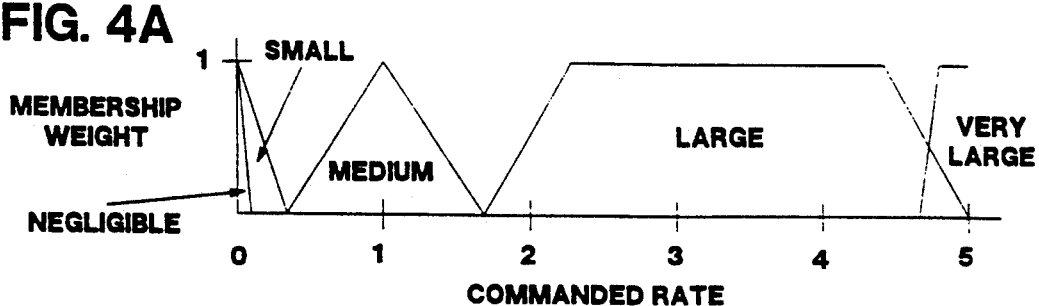
FIGS. 4a through 4e are graphs showing a fuzzy set of membership ranges for helicopter commanded rate, duration, roll attitude, air speed and current/new mode, respectively.
Figure 4B:
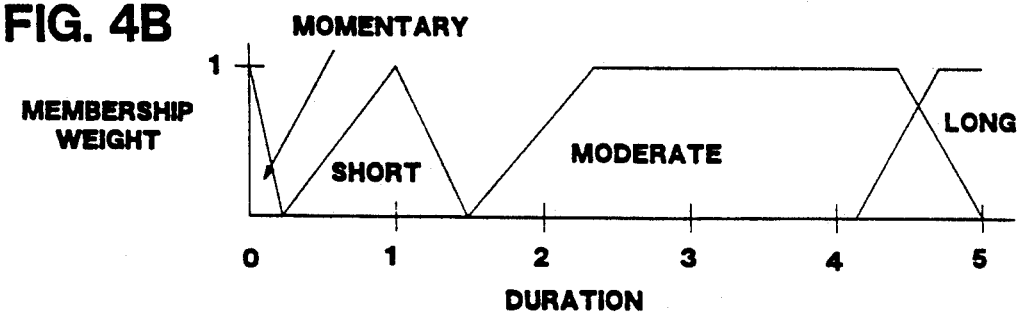
Figure 4C:
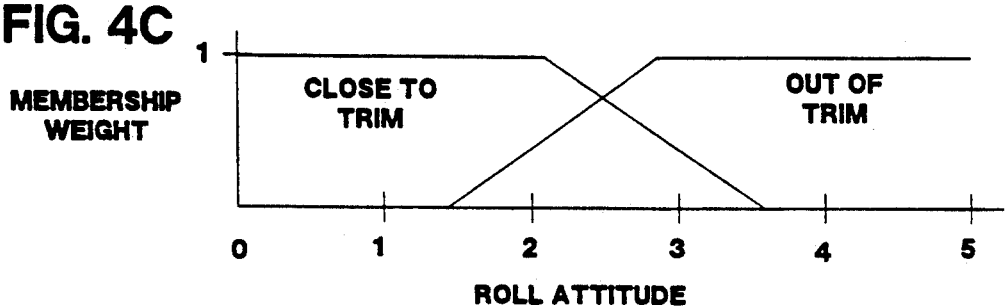
Figure 4D:
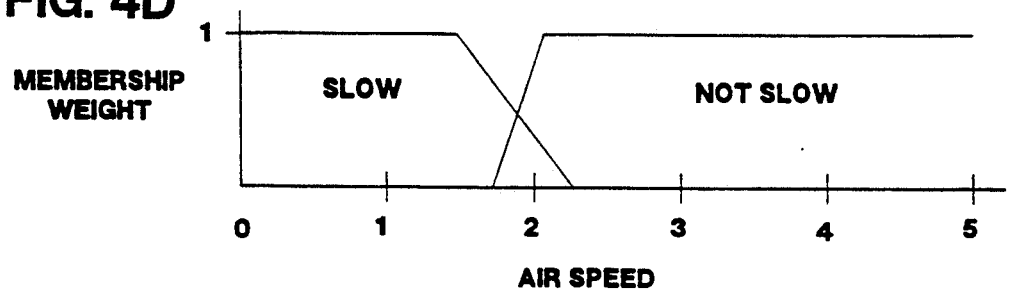
Figure 4E:
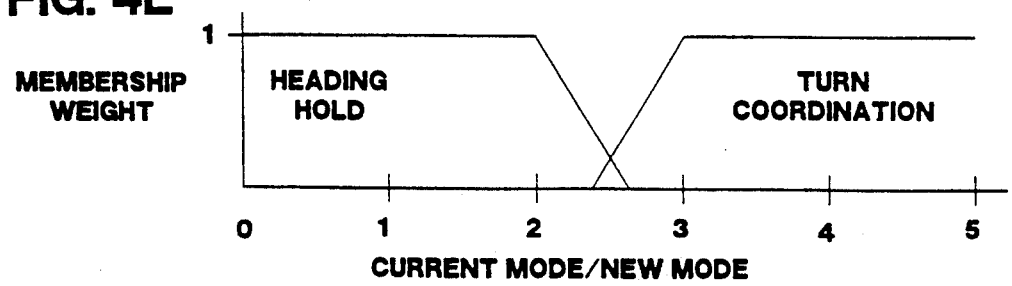

The mode control logic is resident in the memory 80 (FIG. 2), and is executable in the microprocessor 78. The mode control portion of the flight control system 21 is shown in greater detail in FIG. 3. Referring to FIG. 3, the commanded rate (CR) and a signal indicative of the duration (D) of the commanded rate input are provided on the lines 30, and the roll attitude (RA) and air speed (AS) signals are provided on lines 32 to a fuzzification function 100 which converts the input parameter crisp values into fuzzy input values, i.e., CR', D', RA', AS'. The fuzzification function 100 converts the range of possible values for each of the operating parameters used by the mode control into a normalized scale. The normalized scale in effect discretizes a universe into a certain number of segments or quantization levels. Each segment in the discrete universe is labeled as a generic element ($u_i$ where $i=0,1,\ldots,n$). During fuzzification, each fuzzy input is defined by assigning a membership weight ($l_i$) at each generic element of the new discrete universe. After fuzzification, each fuzzy input is represented as a set of ordered pairs of generic elements and corresponding membership weights ($u_i, l_i$).

One method of assigning membership weights to a fuzzy input involves the following steps:

1. Convert the input crisp value into a normalized value (IV).
2. Find the normalized scale segment $u_i$ that is the nearest value (NV) to IV.
3. Find the normalized scale segment $u_i$ that is the next nearest value (NNV) to IV.
4. Assign a membership weight $l_{NV}$ of 1.0 to NV.
5. Determine the membership weight $l_{NNV}$ for NNV using equation 1 below:

$$l_{NNV} = (IV - NV)/(NNV - IV) \qquad \text{(eq. 1)}$$

Alternatively, the membership weight $l_{NV}$ can be determined using equation 2 below:

$$l_{NV} = (IV - NNV)/(NV - NNV) \qquad \text{(eq. 2)}$$

Thereafter, the membership weight $l_{NNV}$ for NNV is determined using equation 3 below:

$$l_{NNV} = 1 - l_{NV} \qquad \text{(eq. 3)}$$

The fuzzification of the input parameters is best understood by example. If the scale is discretized into 6 segments, $u_i$, $i=0,1,\ldots,5$, and the range of possible values for commanded rate are between zero and 30, then each segment represents 6 units of commanded rate. If a crisp value of CR=10 is received for commanded rate, the following fuzzy input (CR') is provided using the first method above for determining membership weight:

$$CR'(u_i, l_i) = \{(0,0),(1,0.5),(2,1),(3,0),(4,0),(5,0)\}$$

Using the second method described above for determining membership weight, the following fuzzy input is provided:

$$CR'(u_i, l_i) = \{(0,0),(1,0.33),(2,0.67),(3,0),(4,0),(5,0)\}$$

This fuzzy input provided by the second method above must be normalized by dividing each membership weight by the membership weight having the largest magnitude. This normalization process produces the following results:

$$CR'(u_i, l_i) = \{(0,0),(1,0.5),(2,1),(3,0),(4,0),(5,0)\}$$

The fuzzified input values are provided on lines 102 to an inference function 105. The other input to the inference function 105 is the fuzzified value of current mode on a line 107. The output of the inference function 105 is the fuzzified value of new mode on line 107, and therefore, during normal operations, this value is provided in a feedback loop as the current mode for redetermining new mode during the next input parameter sample period. However, when the autopilot is initially activated, there is no new mode output of the inference function 105, and therefore the initial fuzzy value of current mode (CM') is provided by an initial mode function 108. The initial mode function provides a fuzzy input value for current mode corresponding to operation in the heading hold mode.

The inference function 105 applies a compositional rule of inference across each fuzzy input and a composite mode selection rule base, $R_c$ 110. The composite mode selection rule base 110 is a composite of a plurality of mode selection rules, and reflects the combined encapsulated knowledge of all mode selection rules for each potential combination of fuzzy inputs. The inputs to the mode selection rules are provided by sets of fuzzy membership ranges for each input parameter.

FIGS. 4a through 4e graphically depict the sets of fuzzy membership ranges for each input parameter. The scale on the horizontal axis of each graph is the segment value $u_i$, and the vertical axis scale is the membership weight $l_i$. The scale factor relating commanded rate to the segment value is 6 and the scale factor relating air speed to the segment value is 30, e.g., commanded rate can be obtained by multiplying the segment value by 6. The scale factor for the remaining input parameters is 2.

The individual membership ranges for each of the input parameters represent a specific term or characteristic of the input parameter, e.g., small, short, slow, etc., and the membership weight assigned to an input parameter within a membership range varies as the magnitude of the input parameter changes. For example, referring to FIG. 4c, roll attitude is considered close to trim provided that roll attitude (normalized) is less than 3.5. However, the close to trim membership weight for a roll attitude of 3.0 (normalized) is 0.3 while the close to trim membership weight for a roll attitude of 1.0 (normalized) is 1.0.

The sets of fuzzy membership ranges can also be represented using a numerical definition which defines the membership weight $l_i$ for each quantization level or segment $u_i$. The numerical definition of the fuzzy membership ranges for each of the input parameters is shown in FIGS. 5a through 5e. The numerical definitions of FIGS. 5a through 5e correspond to the sets of membership ranges depicted graphically in FIGS. 4a through 4e.

Mode selection rules characterize expert pilot experience and control engineering knowledge for making mode selection decisions. The rules are expressed as IF-THEN fuzzy conditional statements. The rules are based on the characteristics defined by the membership ranges for each of the input parameters. The present invention utilizes 15 mode selection rules for selecting a new mode. Rules 1 through 6 correspond to a heading hold (HH) mode selection and rules 7 through 15 correspond to a turn coordination (TC) mode selection:

| RULES |
| --- |
| RULE 1 |
| If commanded rate is medium; and |
| current mode is HH; and |
| duration is small; and |
| roll attitude is anything; and |
| air speed is anything; then |
| new mode is HH. |
| RULE 2 |
| If commanded rate is medium; and |

RULES -continued current mode is HH; and
duration is momentary; and
roll attitude is anything; and
air speed is anything; then
new mode is HH.

RULE 3
If commanded rate is small; and
current mode is HH; and
duration is small; and
roll attitude is anything; and
air speed is anything; then
new mode is HH.

RULE 4
If commanded rate is small; and
current mode is HH; and
duration is momentary; and
roll attitude is anything; and
air speed is anything; then
new mode is HH.

RULE 5
If commanded rate is negligible; and
current mode is HH; and
duration is anything; and
roll attitude is anything; and
air speed is anything; then
new mode is HH.

RULE 6
If commanded rate is negligible; and
current mode is TC; and
duration is anything; and
roll attitude is close-to-trim; and
air speed is anything; then
new mode is HH.

RULE 7
If commanded rate is large; and
current mode is anything; and
duration is anything; and
roll attitude is anything; and
air speed is not small; then
new mode is TC.

RULE 8
If commanded rate is very large; and
current mode is anything; and
duration is anything; and
roll attitude is anything; and
air speed is not small; then
new mode is TC.

RULE 9
If commanded rate is medium; and
current mode is anything; and
duration is moderate; and
roll attitude is anything; and
air speed is not small; then
new mode is TC.

RULE 10
If commanded rate is medium; and
current mode is anything; and
duration is long; and
roll attitude is anything; and
air speed is not small; then
new mode is TC.

RULE 11
If commanded rate is medium; and
current mode is TC; and
duration is anything; and
roll attitude is anything; and
air speed is not small; then
new mode is TC.

RULE 12
If commanded rate is small; and
current mode is TC; and
duration is anything; and
roll attitude is anything; and
air speed is not small; then
new mode is TC.

RULE 13
If commanded rate is small; and
current mode is HH; and
duration is long; and
roll attitude is anything; and
air speed is not small; then
new mode is TC.

RULE 14
If commanded rate is small; and
current mode is HH; and
duration is medium; and
roll attitude is anything; and
air speed is not small; then
new mode is TC.

RULE 15
If commanded rate is negligible; and
current mode is TC; and
duration is anything; and
roll attitude is out-of-trim; and
air speed is not small; then
new mode is TC.

The present invention tabulates the results of each mode selection rule for all possible combinations of input values to thereby provide an m-dimensional array, e.g., hyperplane or hypercube, where m is the number of input parameters and control outputs, i.e., a six dimensional array including 5 input parameters and one control output. Each location in the array comprises the combination results obtained from the minimum cartesian cross product of the conditional statement for each input parameter at each possible input value $u_i$. That is, for each input parameter combination ($u_{CRi}$, $u_{CMi}$, $u_{Di}$, $u_{RAi}$, $u_{ASi}$), where i=0,1,...,5, the minimum membership weight $l_i$ for the given combination, as determined for example by applying the numerical definitions in FIGS. 5a through 5e to the rule, determine the minimum membership weight for the given combination. For example, the Rule 1 array position (0,0,0,0,0,0) contains a membership weight of 0 because the membership weight assigned to "commanded rate is medium" at segment 0 is equal to zero. Similarly, the Rule 3 array position (0,0,0,0,0,0) contains a membership weight of 1 because the membership weight of each of the conditional statements in the rule have a value of 1 at segment 0.

The composition, e.g., cross product, of all of the rule arrays are taken wherein the maximum membership weight for each combination of input parameters across all of the rules is used to provide the membership weight to be stored in a corresponding location in the composite mode selection rule base $R_c$ 110 (FIG. 3). The membership signal stored at each location in the array is a composite mode selection signal. The composite mode selection rule base is only derived once, and thereafter, it is provided as a look-up table which defines an output for all possible combinations of operating parameters. By providing the look-up table using off-line processing, on-line processing is freed up for other operations and run time is minimized. Although the fuzzy membership ranges and mode selection rules are depicted in FIG. 3, these values are only used during the off-line processing to derive the composite mode selection rule base. Because the composite rule base is provided as a look-up table, the number of rules can be increased without increasing on-line run time because each rule is accounted for in the composite mode selection rule base.

Referring again to FIG. 3, the output of the inference function 105 is the fuzzified value of new mode on line 107 and is arrived at by applying the compositional rule of inference, e.g., minimum cross product, across each fuzzy input and the composite mode selection rule base. The fuzzified value of new mode is in the form of a set of ordered pairs of segments and corresponding membership weights $(u_i, l_i)$ where $i=0, 1, \ldots, 5$. The fuzzified value of new mode is applied to a de-fuzzification function 112 which converts the fuzzified value of new mode into a crisp value. The de-fuzzification function 112 uses a Center of Area (COA) method to de-fuzzify the fuzzified value of new mode. First, only those ordered pairs of segments and membership weights are used for determining the crisp value where the membership weight is greater than or equal to a threshold value, a. Thereafter, the crisp value is determined as the weighted sum of those ordered pairs which meet the a-threshold criteria using equation 4 below:

$$NM = R(u_i * l_i)/R(u_i) \qquad \text{(eq. 4)}$$

The new mode output crisp value is then compared to the membership ranges for new mode (FIGS. 4e and 5e), and the new mode is determined from the membership range having the greatest membership weight at the scaled value of the new mode output crisp value.

The commanded roll rate is described herein as being provided by a force feel actuator; however, any method of commanding a roll input will work equally well with the present invention. Additionally, the invention is described as controlling the mode of a flight control system having a primary flight control system and an automatic flight control system. However, the invention will work equally as well in any flight control system architecture, all that is required is that the flight control system be provided with a heading hold mode and a turn coordination mode. It will also be understood by those skilled in the art that although the invention is described with respect to a helicopter flight control system, it will work equally as well with flight control systems on other types of aircraft provided that the flight control system is capable of operation in both a turn coordination mode and a heading hold mode.

The composite mode control rule base is described herein as the composition of 15 mode selection rules. However, additional rules may be provided to further enhance the mode selection performance without causing any increase in processing time. In this case all that is required is that the composite rule base be modified to include any changes brought about by the additional rules.

Although the sets of fuzzy membership ranges are defined in FIGS. 4 and 5, these ranges may be modified as necessary to enhance mode selection performance or to accommodate additional mode selection rules. Additionally, any cycle times, gains counts, and the like contained herein may of course be adjusted to suit any implementation and utilization of the invention.

The method of de-fuzzification described herein provides a crisp output as the weighted sum of ordered pairs having a membership weight above an a-threshold magnitude. However, it is anticipated that any suitable de-fuzzification method may be employed without departing from the spirit and scope of the present invention. Additionally, although the mode selection function of FIG. 3 is provided with an initial mode function 108 for providing the initial fuzzy value of current mode when the autopilot is activated, it is anticipated that the invention will work equally as well without the initial mode function. In this case, the initial new mode selection merely considers the fuzzy input value of current mode as a set of ordered pairs $(u_i, l_i)$ each having a membership weight $l_i$ equal to one.

Although the invention has been shown and described with respect to exemplary embodiments thereof, it should be understood by those skilled in the art that the foregoing and other changes, omissions and additions may be made therein and thereto without departing from the spirit and scope of the present invention.

We claim:

1. Apparatus for controlling an aircraft flight control system between a turn coordination mode and a heading hold mode, wherein the flight control system provides control surface command signal to the aircraft control surfaces to control the yaw, pitch, roll and lift axes of the aircraft in flight, the apparatus comprising:

control means operable by a pilot to provide axis command signals for controlling a given axis of the aircraft;

sensing means for sensing a plurality of aircraft operating parameters and for providing operating parameter signals indicative thereof;

fuzzification means responsive to some of said axis command signals and some of said operating parameter signals for providing fuzzy input signals indicative thereof;

composite mode selection rule base means for providing a composite mode selection signal for each possible combination of said fuzzy input signals;

processing means responsive to said composite mode selection rule base means and said fuzzy input signals for providing a new mode fuzzy output signal;

defuzzification means responsive to said new mode fuzzy output signal for providing a crisp output signal indicative thereof; and mode selection means responsive to said crisp output signal for selecting either the turn coordination mode or the heading hold mode and for placing the flight control system in said selected mode.

2. Apparatus according to claim 1 further comprising memory means for storing said composite mode selection rule base.

3. Apparatus according to claim 2 wherein said fuzzification means comprises:

scaling means for applying a scale factor to each of said axis command signals and said operating parameter signals to thereby provide corresponding scaled value signals in relation to discrete segments $(u_i)$ on a normalized scale;

membership weight assignment means responsive to said scaled value signals for providing a membership weight $(l_i)$ value at each discrete segment $(u_i)$ on said normalized scale for each of said scaled value signals; and each of said fuzzy input signals thereby being represented as a set of ordered pairs of discrete segments and corresponding membership weights $(u_i, l_i)$.

4. Apparatus according to claim 3 wherein said defuzzification means comprises means for providing said crisp output signals as the weighted sum of each of said membership weights in excess of a threshold value for each of said segments.

5. Apparatus according to claim 4 wherein said composite mode selection rule base is generated as a composition of a plurality of mode selection rules each of which represents a suitable mode selection decision.

6. Apparatus for controlling an aircraft flight control system between a turn coordination mode and a heading hold mode, wherein the flight control system provides control surface command signal to the aircraft control surfaces to control the yaw, pitch, roll and lift axes of the aircraft in flight, the apparatus comprising:

control means operable by a pilot to provide axis command signals for controlling a given axis of the aircraft;

sensing means for sensing aircraft operating parameters and for providing operating parameter signals indicative thereof;

microprocessor means responsive to some of said axis command signals and some of said operating parameter signals, said microprocessor means being operative according to fuzzy logic and including:

means for providing fuzzy input signals indicative of fuzzy input values corresponding to said axis command signals and said operating parameter signals;

means for providing a composite mode selection signal for each possible combination of said fuzzy input signals;

means responsive to said composite mode selection signals and said fuzzy input signals for providing a new mode output signal; and mode selection means responsive to said new mode output signal for selecting either the turn coordination mode or the heading hold mode and for placing the flight control system in said selected mode.

7. Apparatus according to claim 6 further comprising memory means for storing said composite mode selection signals.

8. Apparatus according to claim 7 wherein said composite mode selection signals are generated as a composition of a plurality of mode selection rules each of which represents a suitable mode selection decision.

9. A method of controlling an aircraft flight control system between a turn coordination mode and a heading hold mode, wherein the flight control system provides control surface command signal to the aircraft control surfaces to control the yaw, pitch, roll and lift axes of the aircraft in flight, the method comprising the steps of:

providing axis command signals in response to the operation of pilot operable controls, said axis command signal controlling a given axis of said aircraft;

sensing a plurality of aircraft operating parameters and providing operating parameter signals indicative thereof;

fuzzifying some of said axis command signals and some of said operating parameter signals for providing fuzzy input signals indicative thereof;

providing a composite mode selection signal for each possible combination of said fuzzy input signals;

applying a compositional rule of inference to said composite mode selection signals and said fuzzy input signals for providing a new mode fuzzy output signal;

defuzzifying said new mode fuzzy output signal for providing a crisp output signal indicative thereof;

selecting either the turn coordination mode or the heading hold mode as a flight control system new mode in response to said crisp output signal; and placing the flight control system in said selected new mode.

10. The method of claim 9 wherein said step of providing a composite mode selection signal further comprises the steps of:

providing a plurality of mode selection rules each of which represents a suitable mode selection decision; and generating said composite mode selection signals as a composition of said plurality of mode selection rules.

11. The method of claim 10 further comprising the step of providing a memory means for storing said mode selections signals for each possible combination of said fuzzy input signals.

12. The method according to claim 11 wherein said step of fuzzifying some of said axis command signals and some of said operating parameter signals further comprises the steps of:

applying a scale factor to each of said axis command signals and said operating parameter signals to thereby provide corresponding scaled value signals in relation to discrete segments ($u_i$) on a normalized scale;

assigning a membership weight ($l_i$) value at each discrete segment ($u_i$) on said normalized scale for each of said scaled value signals; and representing each of said fuzzy input signals as a set of ordered pairs of discrete segments and corresponding membership weights ($u_i, l_i$).

13. The method according to claim 12 wherein said step of defuzzifying said new mode fuzzy output signal comprises the step of providing said crisp output signals as the weighted sum of each of said membership weights in excess of a threshold value for each of said segments.

* * * * *